March 10, 1925.  W. E. CRAWFORD  1,529,012
VELOCIPEDE
Filed Jan. 23, 1924
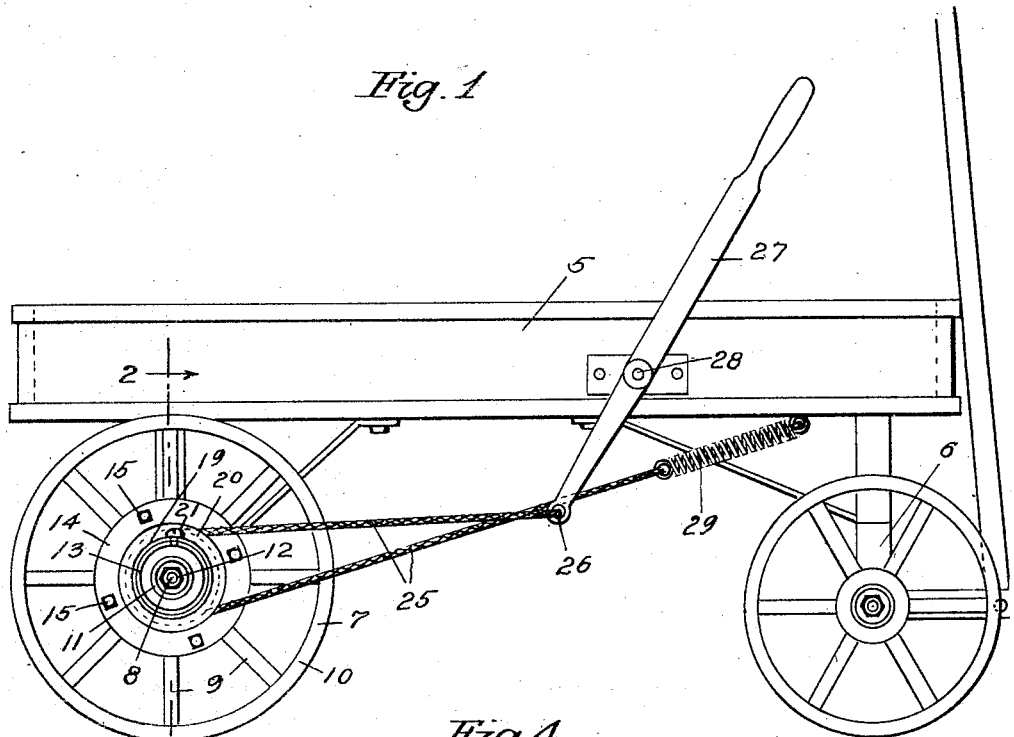
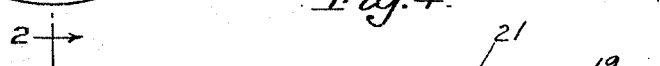
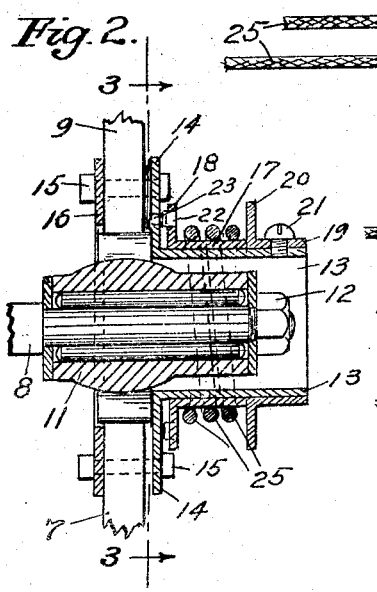
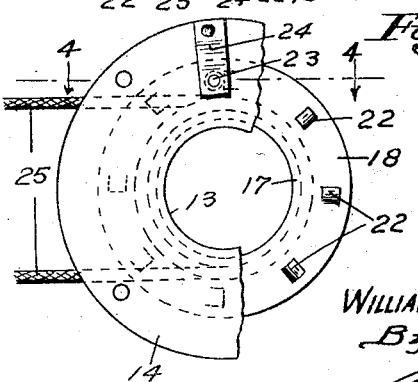
Inventor
WILLIAM EMERSON CRAWFORD
By his Attorney Patented Mar. 10, 1925.

1,529,012

UNITED STATES PATENT OFFICE.

WILLIAM E. CRAWFORD, OF HAVRE, MONTANA.

VELOCIPEDE.

Application filed January 23, 1924. Serial No. 688,085.

*To all whom it may concern:*

Be it known that I, WILLIAM E. CRAWFORD, a citizen of the United States, residing at Havre, in the county of Hill and State of Montana, have invented certain new and useful Improvements in Velocipedes, of which the following is a specification.

This invention relates to velocipedes and the main object is to provide a propelling device, for rotating one rear wheel of the velocipede or wagon, which is particularly adaptable as an attachment for use in connection with standard types of children's vehicles which are already manufactured, although the device may also be supplied with the wagons as they are being constructed. Further objects will be disclosed in the course of the following specification, reference being had to the accompanying drawing, in which:

Fig. 1 is a side elevation of a child's wagon, showing my driving mechanism as attached thereto.

Fig. 2 is an enlarged diametrical section as seen on the line 2—2 in Fig. 1.

Fig. 3 is a fractional detail view on the line 3—3 in Fig. 2.

Fig. 4 is a partly sectional detail view as seen substantially on the line 4—4 in Fig. 3.

Referring to the drawing more particularly and by reference characters, 5 designates the body of a vehicle, having a front steering truck 6 and rear wheels 7 on a rear axle 8; said rear wheels each having spokes 9, a rim 10 and a hub 11 secured on the shaft by a nut 12, all of common and well known construction.

Concentrically arranged over the outer end of the hub 11 is a cylindrical member 13, having a wide annular flange 14 at its inner end which is rigidly secured upon one of the wheels 7 by bolts 15. Said bolts pass between spokes 9 of the wheel and clamp them between the flange or plate 14 and a ring 16 upon the inner face of the wheel.

A drum 17, having a flange 18, is rotatably mounted upon the cylinder 13, and is retained in place by a collar 19 having a flange 20. The collar 19 is similar in shape to the rotatable drum, but is rigidly secured on the cylinder 13 by a set screw 21. The flange 18 is provided, at spaced intervals, with integral punched out ratchet teeth 22 adapted to engage a pin 23 which extends through the plate 14. The pin 23 is secured to a spring 24, on the plate 14, in such a manner that when the drum is rotated in one direction the teeth 22 will engage the pin and turn the plate 14 (and the wheel) in the same direction, but when the direction of the drum is reversed the teeth will slip over the pin in an idle manner.

The drum is rotated in alternate directions by a cable 25 which is wound several times about the drum, to give the required grip or friction. One end of the cable is secured, as at 26, to the lower end of a hand lever 27, which is fulcrumed as at 28 to the body 5 of the vehicle; and the other end is connected by a spring 29 to another point on the body, as shown in Fig. 1. The object of the spring is to keep the cable taut at all times and also to permit the cable to be pulled by the hand lever, to rotate the drum, and pulls the cable and the drum back into its normal position when the lever is released. It will thus be readily understood that as the lever is intermittently pulled back by the operator and forward by the spring a rotating movement of the wheel, in a forward direction, will result, thus driving the wagon or vehicle along over the ground. It will also be readily seen that a driving mechanism and clutch of the character here described will not in any manner interfere with the movement of the wagon when the lever is not being manually actuated, as the wheel will rotate in either direction at such time. The ratchet clutch will permit the free forward movement of the vehicle, while the resistance of the spring 29 is all that will resist the rearward movement.

It is further understood that suitable modifications may be made in the general design and structural details of the invention, as herein described, provided, however, that such modifications come within the spirit and scope of the appended claims.

Having now therefore fully shown and described my invention, what I claim to be new and desire to protect by United States Letters Patent is:

1. Means for driving a ground wheel of a vehicle consisting of a cylindrical member adapted to be rigidly and concentrically secured upon one side of the wheel, a drum rotatably mounted on said member, a ratchet mechanism operatively connecting the drum and said member, a cable wound upon the drum, manually operated means for pulling the cable to affect rotation of the drum and wheel in a forward direction, and spring means for returning the drum and cable to initial positions.

2. Means for driving a ground wheel of a vehicle, consisting of a cylindrical member having an annular flange adapted to be bolted to the wheel with the cylindrical member concentrically arranged about the hub thereof, a drum mounted on the cylindrical member to drive the same in a forwardly direction, through a clutch, a cable wound upon the drum, means for pulling one end of the cable to rotate the drum in one direction, and spring means at the other end of the cable to rotate the drum in the other direction.

In testimony whereof I affix my signature.

WILLIAM E. CRAWFORD.